United States Patent Office 2,755,290
Patented July 17, 1956

2,755,290

ESTERS OF SULFONIC ACIDS AND CERTAIN EPOXY-SUBSTITUTED ALCOHOLS AND METHOD FOR THEIR PREPARATION

Albert C. Mueller, Berkeley, Calif., assignor to Shell Development Company, New York, N. Y., a corporation of Delaware No Drawing. Application October 26, 1953, Serial No. 388,434

12 Claims. (Cl. 260—348)

This invention relates to a new class of epoxy-substituted organic compounds and to their preparation. More particularly, the invention relates to certain epoxy-substituted esters of sulfonic acids, to the preparation of these esters and to their utilization, particularly as stabilizers and plasticizers and as monomers for the preparation of valuable polymeric materials.

Specifically, the invention provides new and particularly useful epoxy-substituted compounds comprising esters of sulfonic acids and epoxy-substituted alcohols which possess the grouping

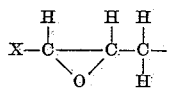

where X is a hydrogen or a hydrocarbon radical.

The invention also provides polymers of the above-described esters which are obtained by polymerizing the esters through the epoxy groups alone or with other epoxy-substituted materials, such as the polyepoxide polyethers obtained by reacting polyhydric phenols with epichlorohydrin.

It is an object of the invention to provide a new class of epoxy-substituted organic compounds. It is a further object to provide certain novel epoxy-substituted esters of sulfonic acids, and a method for their preparation. It is a further object to provide epoxy-substituted esters of sulfonic acids which are particularly useful and valuable in the chemical and related industries. It is a further object to provide epoxy-substituted esters of sulfonic acids which are particularly valuable as stabilizers and plasticizers for vinyl polymers. It is a further object to provide certain novel epoxy-substituted esters of sulfonic acids, which are useful as lubricants and softening agents for synthetic rubbers. It is a further object to provide novel epoxy-substituted esters of sulfonic acids which are valuable in the preparation of improved resinous products. Other objects and advantages of the invention will be apparent from the following detailed description thereof.

It has now been discovered that these and other objects may be accomplished in part by the novel compounds of the invention comprising esters of sulfonic acids, and preferably the hydrocarbon sulfonic acids, and epoxy-substituted alcohols which possess grouping

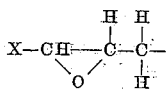

wherein X is hydrogen or a hydrocarbon radical, said esters preferably being prepared by reacting a sulfonyl halide with the epoxy-substituted alcohol in the presence of a hydrogen halide-absorbing material at a relatively low temperature. It has been unexpectedly found that these particular esters possess many unobvious beneficial properties which make them particularly adapted for important commercial applications. These novel esters are, for example, good stabilizers for vinyl polymers, and particularly the halogen-containing polymers as poly(vinyl chloride), and endow the resulting compositions with improved resistance to decomposition by heat and light. The novel esters are also valuable in the role of a plasticizer and softening agent for the vinyl polymers, synthetic rubbers and other types of resinous materials. When added to polymers, such as the halogen-containing polymers, the novel esters may act both as a plasticizing agent and as a stabilizing agent.

It has also been found that when the above-described novel esters are treated with certain catalytic materials, such as primary and secondary amines, they polymerize through the epoxy linkage to form useful and valuable polymeric products. They may be polymerized in this manner by themselves or with other mono- or polyepoxide materials. As indicated hereinafter, particularly valuable products are obtained by polymerizing the novel esters with polyepoxide polyethers obtained by reacting polyhydric phenols with epichlorohydrin.

The sulfonic acids, the esters of which are provided by the present invention may be any organic compound which possesses one or more $SO_3H$ groups. The acids may be aliphatic, cycloaliphatic, aromatic or heterocyclic, saturated or unsaturated and may be substituted with a great variety of different substituents, such as, for example, hydroxyl groups, peroxy groups, carboxyl groups, ether groups, halogen atoms, nitro groups, —S—, —$SO_2$— groups, and the like. These sulfonic acids may be exemplified by benzenesulfonic acid, toluenesulfonic acid, nonylnaphthalenesulfonic acid, phenylmethanesulfonic acid, octylnaphthalenesulfonic acid, methanesulfonic acid, butanesulfonic acid, octanesulfonic acid, dodecanesulfonic acid, octadecanesulfonic acid, methoxymethanesulfonic acid, butoxymethanesulfonic acid, p-styrenesulfonic acid, chlorobenzenesulfonic acid, m-styrenesulfonic acid, 7-methyl-2-octenesulfonic acid, 2-methyl - 2 - hexenesulfonic acid, 1 - methyl - 1 - butyl - 2 - butensulfonic acid, 4 - nitro - 1 - chloro - benzene - 2 - sulfonic acid, 2 - nitro - 1 - chlorobenzene - 4 - sulfonic acid, 2 - chloromethylpropanesulfonic acid, 2 - (chloro - tertiary - butylperoxy) - 2 - chloro - methylpropanesulfonic acid, 2 - aminobenzene - 5 - sulfonic acid, 2 - chloro - 1 - carboxy - benzene - 5 - sulfonic acid, 1 - hydroxy - 4 - methylbenzene - 4 - sulfonic acid, 2,4 - diaminobenzene - 5 - sulfonic acid, methane disulfonic acid, chloromethane sulfonic acid, mahogany sulfonic acids, petrolatum sulfonic acids, 2-amino - 5 - carboxy-benzene-1-sulfonic acid, mono- and polywax-substituted sulfonic and polysulfonic acids, cetylchloro-benzenesulfonic acid, caprylbenzenesulfonic acid, nitronaphthalenesulfonic acid, tetraisobutylene sulfonic acids, lauryl cyclohexanesulfonic acid, cyclohexenesulfonic acid, 4-mercaptobenzene-1-sulfonic acid, 3-thio-ethylbenzene-1-sulfonic acid, and various sulfonated polymers, such as sulfonated polyethylene and the like.

Preferred sulfonic acids are the hydrocarbon sulfonic acids and their alkoxy-, hydroxy-, chloro- and nitro-substituted derivatives, such as benzenesulfonic acid, toluenesulfonic acid, methoxymethanesulfonic acid, p-butoxybenzenesulfonic acid, p-hydroxybenzenesulfonic acid, p-chlorobenzenesulfonic acid, naphthalenesulfonic acid, nonylnaphthalenesulfonic acid, nitrobenzenesulfonic acid, 2-methyl-2-hexenesulfonic acid, 1-methyl-1-butyl-2-butenesulfonic acid, 2,4-diaminobenzene-5-sulfonic acid, and the like.

Particularly preferred are the hydrocarbon sulfonic acids as the aromatic hydrocarbon sulfonic acids, the alkyl-substituted aromatic sulfonic acids, the cycloalkanesulfonic acids, the cycloalkenesulfonic acids, the alkanesulfonic acids and the alkenesulfonic acids, particularly those containing no more than 30 carbon atoms, and more particularly those containing no more than 20 carbon atoms, such as cyclohexanesulfonic acid, 4-cyclohexene-1-sulfonic acid, benzenesulfonic acid, heptylnaphthalenesulfonic acid, octylbenzenesulfonic acid, octadecanesulfonic acid, dodecanesulfonic acid, 3-octenesulfonic acid, 2-methyl-2-hexenesulfonic acid, octadecylbenzenesulfonic acid, isopropylbenzenesulfonic acid, and the like.

Of special interest, particularly because of the fine properties of their resulting esters as plasticizers and stabilizers, are the arylsulfonic acids, the alkarylsulfonic acids, the alkanesulfonic acids and the cycloalkanesulfonic acids containing no more than 18 carbon atoms. The expression "aryl" as used herein refers to unsubstituted aromatic hydrocarbon radicals, such as phenyl, naphthyl, and the like, and the expression "alkaryl" refers to the alkyl-substituted aryl radicals, such as ethylphenyl, butylphenyl nonylnaphthyl, and particularly those wherein the alkyl group contains from 1 to 18 carbon atoms, and more particularly from 2 to 12 carbon atoms.

The above-described sulfonic acids or their corresponding halides may be prepared by a variety of different methods known to the art. The hydrocarbon sulfonic acids or their halides may be prepared, for example, by methods disclosed in Kharash et al., J. Am. Chem. Soc. 61 308 (1939), and U. S. Patent No. 2,412,679. The unsaturated sulfonic acids may be prepared by a method disclosed in U. S. 2,243,331; the peroxy-substituted sulfonic acids are disclosed in U. S. 2,536,008; the aminocarboxy-substituted sulfonic acids are disclosed in U. S. 2,615,913; the chloro-amino-substituted sulfonic acids are disclosed in U. S. 1,646,785 and the styrene sulfonic acids disclosed in U. S. 2,486,417.

The epoxy-substituted alcohols, the novel esters of which are provided by the present invention, include those organic alcohols possessing the grouping

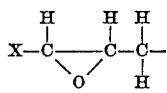

These alcohols may be monohydric or polyhydric and may be substituted with aliphatic, aromatic or heterocyclic radicals and may be saturated or unsaturated. Examples of these alcohols include 2,3-epoxypropanol, 3,4-epoxybutanol, 2,3-epoxyhexanol, 5,6-epoxyoctanol, epoxidized octadecadienol, epoxidized dodecadienol, epoxidized tetradecadienol, 3,4-epoxydihydropyran-5-propanol, 2,3-dimethyl-4,5-epoxyoctanol, 2-methoxy-4,5-epoxyoctanol, 2,3-epoxypropoxypropanol, 2,3-epoxypropoxyhexanol, 2,3-epoxypropoxy-2,4-dihydroxyheptanol, 2,3-epoxydodecanol, and 4-chloro-5,6-epoxydodecanol.

Preferred epoxy-substituted alcohols are the epoxyalkanols, epoxyalkoxyalkanols, epoxyalkenols, epoxyalkoxyalkenols, particularly those containing not more than 15 carbon atoms, such as 2,3-epoxypropanol, 3,4-epoxyhexanol, 2,3-epoxypropoxyhexanol, 2,3-epoxypropoxyoctanol, 2,3-epoxy-5-octenol, 2,3-epoxy-6-dodecanol, 2,3-epoxypropoxy-5-octenol, and the like.

Of special interest are the epoxyalkanols containing from 3 to 8 carbon atoms, and particularly the 2,3-epoxyalkanols.

The above epoxy-substituted alcohols may be prepared by any known method, such as by dehydrohalogenating a corresponding halo-hydroxyl substituted alcohol, or by peroxidizing the corresponding ethylenically unsaturated alcohol using a peracid, such as perbenzoic acid.

The novel esters of the invention are the esters of any one of the above-described acids and any one or more of the above-described epoxy-substituted alcohols. Examples of these esters include, among others, 2,3-epoxypropyl benzenesulfonate, 3,4-epoxypropyl toluenesulfonate, 2,3-epoxypropyl dodecanesulfonate, 4,5-epoxyhexyl decanesulfonate, 2,3-epoxypropyl 7-methyl-2-octenesulfonate, 3,4-epoxybutyl 2-methyl-2-hexenesulfonate, 2,3-epoxyhexyl 4-nitro-1-chlorobenzene-2-sulfonate, 2,3-epoxypropyl nonylnaphthalenesulfonate, 2,3-epoxyhexyl phenolsulfonate, 4,5-epoxyheptyl cyclohexanesulfonate, 2,3-epoxyheptyl hexodecanesulfonate, 3,4-epoxyoctyl 2-nitro-1-chlorobenzene-4-sulfonate, 3,4-epoxydecyl 2-aminobenzene-5-sulfonate, 2,3,-epoxypropyl laurylcyclohexanesulfonate, 2,3-epoxypropoxypropyl benzenesulfonate, 3,4-epoxybutoxyhexyl toluenesulfonate, 2,3-epoxypropoxypropyl caprylbenzenesulfonate, 2,3-epoxypropoxyoctyl 2-carboxybenzene-1-sulfonate, 3,4-epoxydihydropyran-2-propyl toluenesulfonate, 2,3-epoxypropyl methanesulfonate, the 2,3-epoxypropyl ester of the polywax-substituted sulfonic and polysulfonic acids, 2,3-epoxypropyl p-stryrenesulfonate, 2,3-epoxypropyl 2-(chlor-tertiary-butylperoxy) 2-chloromethylpropanesulfonate, and the like.

The preferred esters, i. e., the esters of the hydrocarbon sulfonic acids and their substituted derivatives, and the epoxyalkanols, epoxyalkoxyalkanols, epoxyalkenols, epoxyalkoxyalkenols, may be exemplified by 2,3-epoxypropyl toluenesulfonate, 2,3-epoxypropoxypropyl nonylnaphthalenesulfonate, 2,3-epoxy-5-octadecenyl octylbenzenesulfonate, 2,3-epoxypropoxy-6-dodecenyl butanesulfonate, 3,4-epoxybutoxyhexenyl octylnaphthalene-sulfonate, and the like.

The novel esters of the invention are preferably prepared by treating the desired epoxy-substituted alcohol with an acid halide corresponding to the desired acid in the presence of a hydrogen halide absorbing material. This method of preparation may be illustrated by the following equation showing the preparation of 2,3-epoxypropyl benzenesulfonate from glycidol and benzenesulfonyl chloride:

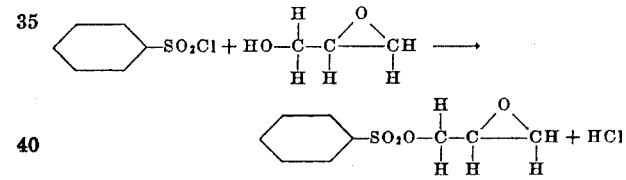

This reaction may be carried out by simply mixing the desired sulfonyl halide with the alcohol in an inert solvent, such as toluene or benzene, in the presence of a hydrogen halide absorbing material at relatively low temperatures. The reactants conveniently may be employed in substantially stoichiometrically required amounts, although in the event one reactant is more precious than the other a moderate excess of the less precious may be employed to insure high conversion of the other reactant to desired product. The reaction is preferably carried out at temperatures within the range of 0° C. to 30° C. In the event excessive heat is liberated in the reaction mixture, the reaction mixture may be cooled or the reaction may be maintained under control by dilution of the mixture with an inert solvent. The reaction may also be regulated by the controlled addition of one reactant, e. g., the sulfonyl halide may be added dropwise to the other reactant. The material used to absorb the hydrogen halide should be one that would not react with the sulfonyl halide or epoxy group or cause polymerization of the epoxide. Preferred materials are the rather weak inorganic bases and tertiary amines, such as triethylamine, triamylamine, pyridine, and the like. Upon completion of the reaction, any salt formed by the reaction of the added hydrogenhalide absorbing material and the liberated hydrogen halide may be removed from the reaction mixture by filtration or equivalent means and the filtrate suitably treated to recover the desired ester. In most cases, fractional distillation is the most convenient method for recovering the desired product although it will be appreciated that other applicable methods, such as extraction, precipitation, and the like, may be used.

The sulfonyl halides used in the above-described process may be any halides of the above-described sulfonic acids, such as, for example, benzenesulfonyl chloride, butanesulfonyl chloride, hexanesulfonyl chloride, dodecylsulfonyl chloride, and the like. The chlorides and promides are particularly preferred for this reaction.

The novel esters may also be prepared by reacting an alkali metal salt of the sulfonic acid with a halo-substituted epoxide, such as epichlorohydrin. The esters may also be prepared by epoxidizing the corresponding unsaturated ester of the sulfonic acids.

The epoxidation of the unsaturated esters of the sulfonic acids is advantageously carried out by reacting the unsaturated ester with an epoxidizing agent at a temperature between about −20° C. to about 60° C. preferably under anhydrous conditions. Organic peracids, such as peracetic acid, perbenzoic acid, monoperphthalic acid and the like, are usually effective epoxidizing agents for this type of reaction. It is preferred to carry out the reaction in a suitable mutual solvent for the reactants' product. Chloroform is an especially useful solvent for this purpose, but other materials, such as ethyl ether, dichloromethane, benzene, ethyl acetate, etc., are also suitable. The epoxy-substituted esters may be recovered from the reaction mixture by any suitable means, such as distillation, extraction, and the like.

The unsaturated esters used in the above-described epoxidation reaction are the esters of the above-described sulfonic acids and unsaturated alcohols, as allyl alcohol, methallyl alcohol, crotyl alcohol, and the like. Examples of such unsaturated esters include, among others, allyl benzenesulfonate, allyl butanesulfonate, methallyl dodecanesulfonate, chloroallyl cyclohexanesulfonate, and the like.

The novel esters of the invention are relatively high boiling liquids to semi-solids. They are soluble in a great many oils and solvents and are compatible with many synthetic resins and polymers. The esters are particularly valuable as additives for vinyl-type polymers as they act to plasticize these polymers and form compositions which have excellent flexibility and strength over a wide range of temperatures and good resistance to water.

The vinyl-type polymers that may be plasticized with the novel esters of the invention include the homopolymers, copolymers and interpolymers of the vinyl-type monomer, i. e., those monomers having a $CH_2=C=$ groups, such as styrene, alpha-methyl styrene, vinyl naphthalene, vinyl phenol, acrylic acid esters as methyl acrylate, propylacrylate, butyl acrylate, esters of substituted acrylic acids, such as methyl methacrylate, lauryl methacrylate, hexyl methacrylate, vinylidene chloride, vinyl chloride, acrylonitrile, methacrylonitrile, vinyl esters as vinyl acetate, vinyl benzoate, vinyl caproate, diallyl phthalate, diallyl succinate, vinyl ethers, such as vinyl ethyl ether, vinyl butyl ether, the vinyl ketones, vinyl pyridine, and the like.

Particularly preferred materials to be plasticized with the novel esters are the halogen-containing polymers and copolymers, and particularly the homopolymer of the vinyl halides and copolymers of the vinyl halides with dissimilar monomers as the unsaturated esters.

A single novel ester may be used as the plasticizer or a mixture of two or more of the compounds may be utilized. In addition, the esters may be used as plasticizers in combination with other plasticizing materials, such as dioctyl phthalate, dibutyl phthalate, tricresyl phosphate, dibutyl sebacate, and the like.

The amount of the esters to be incorporated with the above-described polymers may vary over a considerable range depending upon the particular type of polymer, intended use of the product, etc. In most cases, the amount of the plasticizer will vary from about 20 to 150 parts by weight per 100 parts by weight of resin. A more preferred range of plasticizer comprises 40 parts to 75 parts by weight for every 100 parts by weight of resin.

The polymer and ester may be compounded by means of conventional equipment such as mills of the heated roll type or internal mixers. The plasticizers and other compounding ingredients, such as fillers and stabilizers, are worked into the vinyl resin so that they are thoroughly dispersed therein by means of such equipment, and the resultant composition then molded, calendered, extruded or otherwise formed into articles of the desired shape by conventional procedure.

The novel esters of the invention may also be used as stabilizing agents for halogen-containing polymers. The esters are easily compatible with these polymers and in combination therewith form compositions which have good resistance to discoloration by heat and/or light. The novel esters may be used as stabilizers by themselves or they may be used in combination with other stabilizing agents, such as urea and thiourea derivatives, metal salts of organic and inorganic acids, and the like.

In most cases, the esters are effective as stabilizers in amounts varying from about .1% to about 5% by weight of the polymer being stabilized, but larger or smaller amounts may be employed as desired or necessary. If other stabilizers are employed in combination with the novel esters, the esters may generally be utilized in smaller quantities, such as from about .01% to about 2% by weight of the polymer.

The esters may be incorporated into the halogen-containing polymers by any suitable method. They may be added in a dissolved, suspended or pulverent state to the desired polymer which, in turn, may be in a dissolved, dispersed or solid stage. In some cases, it may be possible to introduce the novel esters in the reaction mixture during the formation of the halogen-containing polymer. In most cases, however, it will probably be more desirable to add the ester by merely mixing the polymer and ester in a masticator or on heated differential rolls.

As noted above, the novel esters also act as plasticizing materials for these halogen-containing polymers so with these polymers it is possible to utilize the esters as combined stabilizer-plasticizers. In this case, the esters will be added in amounts and in the manner described hereinabove for the use of the esters as plasticizers and in that case the resulting composition will display the desired improvement in flexibility as well as increased resistance to heat and light.

The novel esters are also particularly useful in the preparation of valuable polymeric products. For this purpose they may be polymerized by themselves or with other types of epoxy-containing materials. The homopolymers of the novel esters containing only one epoxy group are preferably obtained by heating the monomers in the presence of a catalyst, such as aluminum chloride, aluminum bromide, bismuth trichloride, zinc chloride and baron trifluoride complexes. About 1% to 10% by weight of the catalyst is usually sufficient to effect the desired degree of polymerization. It is generally preferred to accomplish the polymerization using this type of catalyst in a solvent, such as petroleum ether, chloroform, benzene, isopropyl ether, and the like. The temperature employed will generally vary between about −50° C. to 100° C., and more preferably between 0° C. and 60° C. The lower temperatures tend to give waxy solid type of polymers, while the higher temperatures tend to give viscous liquid to soft solid polymers.

The polymerization of the esters containing two or more epoxy groups, such as the above-described special group of neutral esters of the epoxyalkanols and epoxyalkoxyalkanols and the acids possessing a plurality of sulfonic groups, can be effected by treating the same with a great variety of different catalysts, such as amine catalysts as ethylene diamine, amine-aldehyde or amide-aldehyde type resins, such as those prepared from formaldehyde and amides or amines as urea, thiourea, hydroxy urea, phenyl thiourea, and the like, diisocyanates, dialdehydes, polycarboxylic acids and the like. The amount of catalyst utilized will vary depending upon the type of reactants and catalyst selected, but in most cases will vary from about .1% to 5% by weight. The temperatures employed in the polymerization may also vary over a wide range depending upon the reactants and catalyst. In most instances, the polymerization may be accomplished at temperatures between —15° C. to about 100° C., and more preferably between 20° C. and 60° C.

The properties of the polymers can be altered by copolymerizing them with other compounds. Thus, two or more different esters of the invention may be copolymerized together, or the esters can be copolymerized with other types of epoxy-containing materials, such as ethylene oxide, propylene oxide, isobutylene epoxide, epichlorohydrin, vinyl cyclohexane dioxide, butadiene mono- or dioxide, epoxy ethers, such as diglycidyl ether and glycidyl ethers of polyhydric phenols obtained by reacting a polyhydric phenol, such as bis-phenol, with an excess of halogen-containing epoxide, such as epichlorohydrin, in an alkaline medium, polyepoxy polyethers obtained by reacting, preferably in the presence of an acid-acting compound, such as hydrofluoric acid, a halogen-containing epoxide, such as epichlorohydrin, with a polyhydric alcohol, such as glycerol, ethylene glycol, hexanetriol, sorbitol, mannitol, pentaerythritol, polyglycerol, and the like, and subsequently treating the resulting product with an alkaline component to restore the epoxy group, and polyepoxide esters, such as di(2,3-epoxypropyl)adipate, and the like.

The polymers prepared from the monoepoxy-substituted esters as described above find use in the preparation of coating compositions, impregnating compositions and as additives for lubricating oils as viscosity index improvers, pour point depressants, water-proofing agents for silica gel greases and the like. The homopolymers and copolymers prepared from the epoxy-substituted esters having a plurality of epoxy groups are insoluble, infusible materials useful as pottings, castings and shaped plastic articles.

The novel esters may also be used as chemical intermediates to produce a variety of new chemical compounds and compositions. Thus, they may react with water to form alcohols or they may be combined with alcohols to form hydroxy ethers, or may react with mercaptans to form hydroxy mercaptans.

To illustrate the manner in which the invention may be carried out, the following examples are given. It is to be understood, however, that the examples are for the purpose of illustration and the invention is not to be regarded as limited to any of the specific conditions recited therein. Unless otherwise specified, parts disclosed in the following examples are parts by weight.

*Example I.—2,3-epoxypropyl benzenesulfonate*

About 24 parts of glycidol and 33 parts of triethylamine were dissolved in 150 parts of toluene. This solution was stirred rapidly and held at 0° C. to 10° C. while 58 parts of benzenesulfonyl chloride was added dropwise. The triethylamine hydrochloride formed in the reaction was filtered off and the solvent removed by heating under vacuum. The bottom products were then distilled to yield 2,3-epoxypropyl benzenesulfonate, a viscous liquid having an epoxy value of 0.432 eq./100 g.

The above ester finds use as a combined plasticizer-stabilizer for poly(vinyl chloride) and copolymers of vinyl chloride and vinyl acetate. When the ester is heated with 2,4,6-tri(dimethylaminomethyl)phenol, it forms a solid resin.

Esters having related properties are obtained by replacing the benzenesulfonyl chloride in the above process with equivalent amounts of toluenesulfonyl chloride, propyl benzenesulfonyl chloride, and octyl benzenesulfonyl chloride.

*Example II.—2,3-epoxypropyl dodecanesulfonate*

About 24 parts of glycidol and 33 parts of triethylamine are dissolved in 250 parts of toluene. This solution is stirred rapidly and held at 0° C. to 10° C. while 89 parts of dodecanesulfonyl chloride is added dropwise. The triethylamine hydrochloride formed in the reaction is filtered off and the solvent removed by heating the mixture under vacuum. The bottoms product is identified as 2,3-epoxypropyl dodecanesulfonate

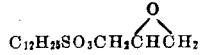

The above ester is compatible with vinyl chloride and acts as a combined stabilizer-plasticizer for that polymer.

Esters having related properties may be obtained by replacing the dodecanesulfonyl chloride with equivalent amounts of each of the following butanesulfonyl chlorides, decanesulfonyl chloride and cyclohexanesulfonyl chloride.

*Example III.—2,3-epoxypropyl nonylnaphthalenesulfonate*

About 24 parts of glycidol and 33 parts of triethylamine are dissolved in 250 parts of toluene. This solution is stirred rapidly and held at 0° C. to 10° C., while 118 parts of nonylnaphthalene-sulfonyl chloride is added dropwise. The triethylamine hydrochloride formed in the reaction is filtered off and the solvent removed by heating the mixture under vacuum. The bottoms product is identified as 2,3-epoxypropyl nonylnaphthalenesulfonate.

This ester may be used as a combined plasticizer-stabilizer for poly(vinyl chloride).

*Example IV. — 2,3-epoxypropoxyethyl benzenesulfonate*

About 20 parts of 2,3-epoxypropoxyethanol (glycidyl ether of ethylene glycol) and 60 parts of triethylamine are dissolved in 250 parts of toluene. This solution is stirred rapidly and held at 0° C. to 10° C. while 60 parts of benzenesulfonyl chloride is added dropwise. The triethylamine hydrochloride formed in the reaction is filtered off and the solvent removed by heating the mixture under vacuum. The liquid product is identified as 2,3-epoxypropoxyethyl benzenesulfonate

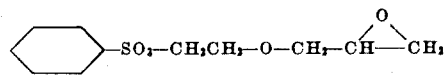

This ester may be used as a combined plasticizer-stabilizer for halogen-containing polymers and as a synthetic lubricant. When 25 parts of the above ester is heated with 3 parts of 2,4,6-tri(dimethylaminoethyl)phenol and 100 parts of an epichlorohydrin-bis-phenol reaction product having a molecular weight of between 300 and 500, the resulting product is a hard, yellow colored resin.

*Example V.—Di(2,3epoxypropyl) naphthalene-1,5-disulfonate*

About 24 parts of glycidol and 33 parts of triethylamine are dissolved in 250 parts of toluene. This solution is held at 0° C. to 10° C. while 118 parts of naphthalene 1,5-disulfonyl chloride is added dropwise. The triethylamine hydrochloride formed in the reaction is filtered off and solvent removed under vacuum. The bottoms product is identified as di(2,3-epoxypropyl) naphthalene -1,5-disulfonate.

I claim as my invention:

1. An ester of (a) an alcohol of the group consisting of lower unsubstituted vicinal-epoxyalkanols and lower unsubstituted vicinal-epoxyalkoxyalkanols and (b) a sulfonic acid of the group consisting of monocarbocyclic aromatic sulfonic acids, bicarbocyclic aromatic sulfonic acids and saturated aliphatic sulfonic acids having as the only substituent from one to two —SO₃H groups.

2. An ester of a lower unsubstituted vicinal-epoxyalkanol as defined in claim 1.

3. A glycidyl ester defined by claim 2.

4. The glycidyl diester of a bicarbocyclic aromatic disulfonic acid having as the only substitutents the two —SO₃H groups.

5. The glycidyl ester of a monocarbocyclic aromatic unsubstituted monosulfonic acid.

6. An ester of a lower unsubstituted vicinal-epoxyalkoxyalkanol defined by claim 1.

7. A process for preparing sulfonic acid esters of epoxy-substituted alcohols which comprises reacting a sulfonic acid chloride of the group consisting of monocarbocyclic aromatic sulfonic acid chlorides, bicarbocyclic aromatic sulfonic acid chlorides and saturated aliphatic sulfonic acid chlorides having as the only substituent from one to two chlorosulfonyl groups with an alcohol of the group consisting of lower unsubstituted vicinal-epoxyalkanols and lower unsubstituted vicinal-epoxyalkoxyalkanols in the presence of a hydrogen halide absorbing material at a temperature below about 30° C. and recovering the desired ester from the reaction mixture.

8. A process defined by claim 7 wherein the alcohol is glycidol.

9. 2,3-epoxypropyl benzenesulfonate.

10. 2,3-epoxypropoxypropyl toluenesulfonate.

11. 2,3-epoxypropyl dodecanesulfonate.

12. Di(2,3-epoxypropyl) naphthalene-1,5 - disulfonate.

References Cited in the file of this patent

UNITED STATES PATENTS 2,089,569    Orthner _____ Aug. 10, 1937